No. 694,417. Patented Mar. 4, 1902.
H. M. PHILLIPS.
CULTIVATOR SHOVEL.
(Application filed Dec. 12, 1901.)
(No Model.)

Witnesses
Henry M. Phillips, Inventor
by C. A. Snow & Co.
Attorneys

THE NORRIS PETERS CO., PHOTO-LITHO., WASHINGTON, D. C.

UNITED STATES PATENT OFFICE.

HENRY MIRON PHILLIPS, OF SPEARVILLE, KANSAS.

CULTIVATOR-SHOVEL.

SPECIFICATION forming part of Letters Patent No. 694,417, dated March 4, 1902.

Application filed December 12, 1901. Serial No. 85,662. (No model.)

*To all whom it may concern:*

Be it known that I, HENRY MIRON PHILLIPS, a citizen of the United States, residing at Spearville, in the county of Ford and State of Kansas, have invented a new and useful Cultivator-Shovel, of which the following is a specification.

This invention is an improved shovel for cultivator-plows, the object of my invention being to effect improvements in the construction of a cultivator-plow shovel whereby the same is rendered more efficient for operation in and pulverizing the soil and destroying weeds between the rows of plants.

To this end my invention consists in the peculiar construction of the cultivator-shovel hereinafter described and claimed.

Figure 1:
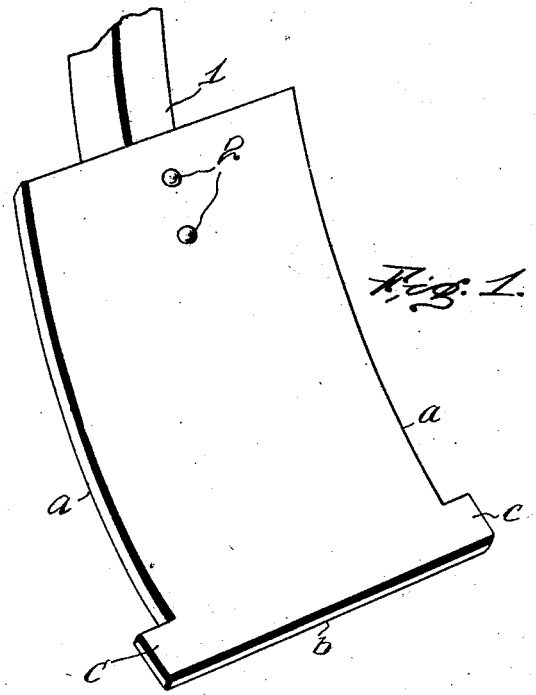
Figure 2:
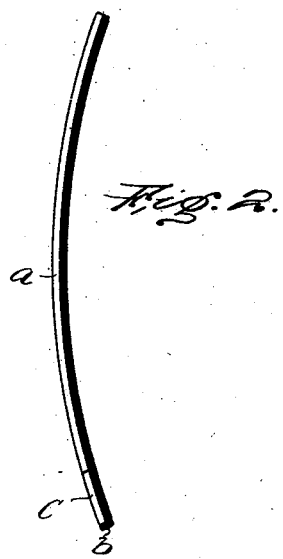
Figure 3:
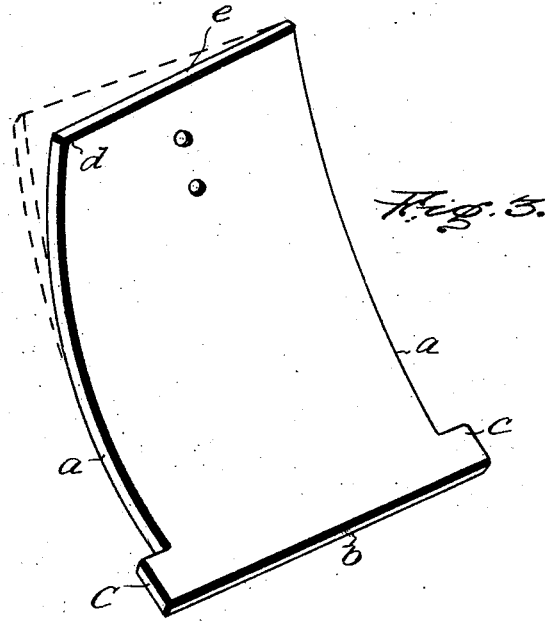
Figure 4:
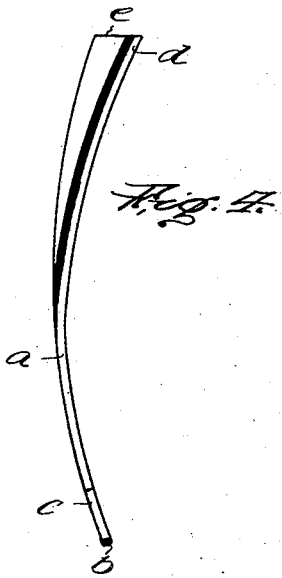

In the accompanying drawings, Figure 1 is a perspective view of a cultivator-shovel embodying my improvements, showing the same attached to the foot or standard of a cultivating-plow. Fig. 2 is a side or edge elevation of the same. Fig. 3 is a perspective view of a modified form of my improved cultivating-shovel. Fig. 4 is a side or edge elevation of the same.

My improved cultivator-shovel is preferably oblong and of rectangular form, with its side edges $a$ parallel or substantially parallel with each other and its lower cutting edge $b$ at right angles to the axis of the shovel, so that when in operation the lower cutting edge $b$ is maintained in a horizontal position below the surface of the soil. At the lower corners of the shovel are formed outwardly-extending pulverizing-points $c$, which are preferably of rectangular form, as here shown; but I do not limit myself in this particular.

In operation my improved cultivator-shovel makes a square cut in the soil, and the outwardly-projecting points thoroughly pulverize the soil. The cultivating-shovel may, as here shown, be attached to the foot or standard 1 of a cultivator-plow by means of bolts 2; but any other means may be employed for attaching the shovel to the foot or standard, and I do not limit myself in this particular. It will be understood that the shovel may by the usual means employed be so connected to the foot or shovel as to be disposed at any desired angle with relation to the line of draft, either at right angles thereto or obliquely.

In the modified form of my invention shown in Figs. 3 and 4 one of the upper corners of the shovel is curved forwardly, as at $d$, hence disposing the upper edge $e$ at an angle with reference to the lower edge $b$ of the shovel. By thus projecting one of the upper corners forwardly the efficiency of the shovel is increased, and the same more readily clears itself of the soil.

Having thus described my invention, I claim—

1. A cultivator-shovel of rectangular form, having its lower cutting edge substantially at right angles to its axis, and provided at its lower corners with outwardly-projecting pulverizing-points, substantially as described.

2. A cultivator-shovel having parallel side edges, a lower cutting edge adapted to run horizontally in the soil and outwardly-projecting pulverizing-points at its lower corners, substantially as described.

3. A cultivator-shovel having a lower, substantially horizontal cutting edge, and outwardly-projecting pulverizing-points at its lower corners, substantially as described.

4. A cultivator-shovel having outwardly-projecting rectangular pulverizing-points at its sides, substantially as described.

5. A cultivator-shovel of rectangular form having outwardly-projecting pulverizing-points at its lower corners and having one of its upper corners curved forwardly, so that the upper edge of the cultivator-shovel is obliquely disposed with reference to the lower edge thereof, substantially as described.

In testimony that I claim the foregoing as my own I have hereto affixed my signature in the presence of two witnesses.

HENRY MIRON PHILLIPS.

Witnesses:
   J. R. BAIRD,
   H. W. DORSETT.